United States Patent [19]
Toukola

[11] Patent Number: 5,600,194
[45] Date of Patent: Feb. 4, 1997

[54] MAGNETIC HYSTERESIS CLUTCH

[75] Inventor: Risto Toukola, Nova Milanese, Italy

[73] Assignee: Ipalco B.V., Netherlands

[21] Appl. No.: 296,251

[22] Filed: Aug. 25, 1994

[30] Foreign Application Priority Data

Aug. 25, 1993 [LU] Luxembourg .................. LU88394

[51] Int. Cl.[6] .................. H02K 49/04; H02K 7/10; H02P 15/00
[52] U.S. Cl. .................................. 310/105; 310/78
[58] Field of Search ................. 310/105, 103, 310/78, 92

[56] References Cited

U.S. PATENT DOCUMENTS

| | | | |
|---|---|---|---|
| 2,683,825 | 7/1954 | Georgeff | 310/96 |
| 3,700,941 | 10/1972 | Duncan | 310/105 |
| 3,848,852 | 11/1974 | Therkildsen | 254/187 R |
| 3,868,852 | 3/1975 | Janssen | 73/233 |
| 3,915,433 | 10/1975 | Therkildsen | 254/187 R |
| 4,036,339 | 7/1977 | Kikuchi | 192/58.61 |
| 4,227,680 | 10/1980 | Hrescak | 254/344 |
| 4,777,397 | 10/1988 | Parshall | 310/156 |
| 4,876,471 | 10/1989 | Lacour | 310/105 |
| 5,204,572 | 4/1993 | Ferreira | 310/156 |

FOREIGN PATENT DOCUMENTS

| | | |
|---|---|---|
| 0269535 | 6/1988 | European Pat. Off. . |
| 1116552 | 11/1961 | Germany . |
| 2139009 | 2/1972 | Germany . |
| 3828110 | 2/1990 | Germany . |

*Primary Examiner*—Steven L. Stephan
*Assistant Examiner*—Jonathan Link
*Attorney, Agent, or Firm*—Fishman, Dionne & Cantor

[57] ABSTRACT

A magnetic hysteresis clutch comprises a rotor supporting a ferromagnetic hysteresis material and a rotary magnetic inductor capable of inducing a magnetic field in the ferromagnetic hysteresis. The magnetic inductor and the ferromagnetic hysteresis clutch is constructed so that an increase in the magnetization losses in the ferromagnetic material, which accompanies an increase in the slip between magnetic inductor and the ferromagnetic hysteresis, leads to a reversible increase in the temperature of the ferromagnetic hysteresis material, and thereby to a reversible decrease in magnetization of the ferromagnetic material which is sufficient to bring about a desired decrease in the transmitted torque. Thus it is possible to provide a magnetic hysteresis clutch in which the transmitted torque reversibly decreases when the slip increases.

13 Claims, 3 Drawing Sheets

MAGNETIC HYSTERESIS CLUTCH

BACKGROUND OF THE INVENTION

1. Field of the Invention

The present invention relates to a magnetic hysteresis clutch.

Such a clutch comprises in particular a rotor supporting a ferromagnetic hysteresis material and a rotary magnetic inductor which induces a magnetic field in the hysteresis ferromagnetic material of the rotor. The magnetic inductor and the hysteresis magnetic material are arranged with an air gap between the two, so as to allow relative rotation of one with respect to the other. The coupling between the magnetic inductor and the magnetic armature takes place by magnetization and demagnetization of the ferromagnetic hysteresis material which is in relative rotation with respect to the magnetic field.

These magnetic hysteresis clutches are used to transmit a torque from an input shaft of the clutch to an output shaft of the clutch in the case where there are significant differences between the speed of rotation of the input shaft and the speed of rotation of the output shaft of the clutch. A typical application of these magnetic hysteresis clutches is found in a reeling-in/reeling-out device delivering a reeling-in torque and a braking torque during reeling-out. In such a device, the input shaft of the clutch is coupled to the drive motor which has a nearly constant speed of rotation. The output shaft of the clutch is coupled to a reeling-in/reeling-out drum. The speed of rotation of the reeling- in/reeling-out drum passes through zero and changes direction, whereas the speed of rotation of the motor is substantially constant. If the maximum speed of rotation of the output shaft of the clutch represents 50% of the speed of rotation of the input shaft of the clutch, both during the reeling-out operation and during the reeling-in operation, the slip between the magnetic inductor and the magnetic armature of the clutch increases by 200% between the reeling-in operation and the reeling-out operation. This is because, during the reeling-in operation, the output shaft of the clutch rotates in the same direction as the input shaft, whereas, during the reeling-out operation, the output shaft of the clutch rotates in the opposite direction to that of the input shaft.

2. Prior Art

In a conventional magnetic hysteresis clutch, the torque transmitted increases with the slip between the magnetic inductor and the magnetic armature. This phenomenon is due to the fact that the magnetic field rotating with respect to the magnetic armature generates eddy currents in the latter which increase the coupling between the magnetic inductor and the magnetic armature. From patent application DE-A-2,139,009 it is known to amplify this phenomenon by fitting the magnetic armature with an element which is a good electrical conductor. This element is applied over the ferromagnetic material of the rotor. The transmitted torque of the magnetic clutch thus obtained strongly increases when the slip between the magnetic inductor and the magnetic armature increases.

European patent EP-A-0,269,535 discloses a magnetic hysteresis clutch wherein the transmitted torque increases only slightly with the slip between the magnetic armature and the magnetic inductor. In this clutch a ferromagnetic hysteresis material which is a poor electrical conductor is used for the magnetic inductor, thus leading to a decrease of eddy currents. More precisely, the ferromagnetic hysteresis material is a molded composite paste comprising a matrix based on a resin in which particles of a hysteresis magnetic material are dispersed. The working temperature of this composite material must be limited to 100° C. so as to prevent its destruction.

For some applications it is however recommended to have a clutch with a negative characteristic curve, that is a clutch wherein the transmitted torque decreases when the slip increases.

SUMMARY OF THE INVENTION

The above-discussed and other drawbacks and deficiencies of the prior art are overcome or alleviated by the magnetic hysteresis clutch of the invention.

The object of the present invention is to provide such a clutch in which the transmitted torque reversibly decreases when the slip increases. This object is achieved by a magnetic hysteresis clutch which is designed so that an increase in the losses in the ferromagnetic material, which accompanies a given increase in the slip, leads to a reversible increase in temperature of the ferromagnetic hysteresis material which is sufficient to produce a decrease in the transmitted torque. The main advantage of the invention is that magnetic hysteresis clutches—which are sturdy, reliable and relatively inexpensive clutches—can now be used in applications in which it is recommended to have a "negative characteristic" of the clutch (that is to say a decrease in the transmitted torque when the slip increases). Indeed, the new clutch makes it not only possible to compensate for the influence of possible eddy currents on the coupling between the rotary magnetic inductor and the rotor supporting the ferromagnetic hysteresis material, but also to have a reversible decrease in the transmitted torque when the slip between the rotor and the magnetic inductor increases. Such a "negative characteristic" could until now be obtained only with electromagnetic clutches fitted with systems for regulating the supply current, which are both complicated and expensive.

In order to achieve a negative characteristic of the clutch, the present invention exploits, in an ingenious way, a known property of ferromagnetic hysteresis materials. This is the decrease in their magnetization in a magnetic field, when their temperature increases. For most ferromagnetic materials this phenomenon is rather unimportant at low temperatures, but gets more and more important with increasing proximity to the Curie point of the ferromagnetic material. Furthermore, the transmitted couple is roughly proportional to the third power of the magnetization of the ferromagnetic material in the magnetic field of the inductor. It follows that some ferromagnetic materials show a practically exploitable temperature range in which a small temperature increase causes a substantial decrease of the transmitted torque. This decrease of the transmitted torque is reversible, in other words, a temperature decrease causes again a substantial increase of the transmitted torque. The ferromagnetic material must, of course, have a maximum working temperature limit greater than the maximum working temperature necessary to achieve the desired decrease in the transmitted torque.

It is also known that the energy dissipated in the ferromagnetic hysteresis material is substantially proportional to the frequency with which the magnetic field varies polarity. In other words, the temperature of the ferromagnetic hysteresis material is substantially proportional to the slip between the magnetic inductor and the ferromagnetic hysteresis material. The working temperature of the ferromagnetic hysteresis material consequently increases from a temperature $t_1$ to a temperature $t_2$ if the slip increases from $V_1$ to $V_2$.

To obtain the desired decrease in the torque it is necessary to carry out an adequate positioning of the working temperatures $t_1$ and $t_2$ in the working range of the ferromagnetic hysteresis material. This positioning can be achieved by acting on a large number of parameters such as, for example: the geometry and the dimensions of the ferromagnetic material, the intensity of its cooling, the strength of the magnetic field, the number of polarity reversals of the magnetic field around the magnetic inductor, the thickness of the air gap, etc. Furthermore, the thermal inertia of the clutch should be as low as possible, in order to allow a quick warming up and cooling down of the ferromagnetic material. The influence of the various parameters on the clutch design is either controlled experimentally or with the aid of a computerized model of the clutch.

The ferromagnetic material is preferably a material with a high receptivity. In this way, the eddy currents that are generated in the ferromagnetic material are of low strength. This results in having to compensate for only a very small increase in the transmitted torque when increasing the slip. Thereafter, a smaller temperature rise in the region of the ferromagnetic material is sufficient to obtain the desired decrease in the transmitted torque.

Excellent results have been obtained by using as ferromagnetic material a sintered material that is based on electrically insulated ferromagnetic metal powders. It will be appreciated that these sintered materials have superior magnetic properties and a higher working temperature than the composite materials comprising ferromagnetic particles dispersed in a resin.

The inventive concept of the present invention is applicable both to a magnetic hysteresis clutch fitted with a radial air gap and to one fitted with an axial air gap between the said rotary magnetic inductor and the said ferromagnetic hysteresis material. However, in practice it has been found that a radial air gap clutch has many advantages over an axial air gap clutch. In this context, it is also important to note that magnetic hysteresis clutches with a radial air gap are hardly known in the state of the art. It will consequently be appreciated that precious technical teachings in the field of magnetic clutches with radial air gap are added to the state of the art.

The proposed radial air gap clutch advantageously comprises a magnetic inductor consisting of a plurality of wheels mounted on a shaft, each of these wheels supporting a plurality of permanent magnets on a peripheral radial ring. This embodiment enables, inter alia, to increase the possibilities of adaptation and adjustment of the clutch by varying the number of inductor wheels used.

The ferromagnetic hysteresis material of the rotor is in this case advantageously distributed over a plurality of rings that are axially separated from each other. Each of these rings surrounds one of the wheels thereby defining a radial air gap with the latter. This embodiment makes it possible, by virtue of the small mass of the individual rings, to achieve a better control of the temperature variation to which the ferromagnetic material is subjected. An optimum controlled cooling of the rotor supporting these ferromagnetic rings is achieved by longitudinal rotor cooling fins.

In a preferred embodiment of the invention, the radial overlapping between some or all of the magnetic inductor wheels and the corresponding ferromagnetic rings may be adjusted by changing their axial alignment. This characteristic allows to finely adjust the transmitted torque.

Preferably each of the said wheels of the magnetic inductor supports a large number of small magnets having a pole surface area of the order of a few tens of square millimeters only. As a result, it is possible to optimize the magnetic field finely to respect the design criteria adopted for the clutch (i.e.: magnetic field strength, number of magnetic polarity reversals per ring).

It will be noted that the clutch is advantageously designed so that heating up of its permanent magnets in the continuous operation mode is accompanied by parallel heating up of the wheels supporting these permanent magnets. This heating up being designed so that the resulting increase in the diameters of the wheels automatically compensates, by a reduction in the air gap, for a decrease in the magnetic field produced by the said permanent magnets. As a result, heating of the clutch during continuous operation does not at all affect, or only slightly affects, the value of the transmitted torque.

In order to prevent a thermal expansion of the rings that would cause an additional decrease in the transmitted torque, these rings are advantageously split into annular segments. The latter are separated circumferentially by slots allowing their free thermal expansion without notable variation of the internal diameter of the split rings. However, it will be noted that for some applications, it may be advantageous to tolerate a radial thermal expansion of the ferromagnetic rings. Such a radial expansion will produce an increase of the radial air gap, leading to a supplementary decrease of the transmitted torque, when the slip increases.

The present invention also provides a reeling-in/reeling-out device (respectively a winding/unwinding device) comprising a drive motor and a reeling-in/reeling-out drum (respectively a winding/unwinding drum). This device is characterized by a magnetic hysteresis clutch according to the invention. The magnetic inductor of this clutch is coupled to the reeling-in/reeling-out drum and the rotor supporting the ferromagnetic hysteresis material is coupled to the drive motor. This device is advantageously distinguished by the fact that the reeling-in torque is higher than the braking torque developed during the reeling-out operation. The coupling to the drive motor of the rotor supporting the ferromagnetic hysteresis material provides optimum constant cooling of the ferromagnetic hysteresis material, because the rotor thus has a high and nearly constant speed of rotation.

This reeling-in/reeling-out device is advantageously fitted with a speed reducer or step-down gear connected between the said rotor and the said reeling-in/reeling-out drum. The purpose of this speed reducer is to decrease the maximum slip, during the reeling-out operation, and the variation in the slip between the reeling-in operation and the reeling-out operation. It will be appreciated that, with a clutch according to the present invention, the reduction ratio of this speed reducer can be decreased, given that an increase in the slip no longer leads to an increase in the transmitted torque. In addition, it will be shown that the effect of the efficiency of the speed reducer on the characteristic of the reeling-in/reeling-out device is compensated for by the negative characteristic of the clutch.

However, it remains to be noted that the use of a clutch according to the invention is not limited to a reeling-in/reeling-out, respectively winding/unwinding device. Its properties, in particular its "negative characteristic", will be appreciated in many other uses.

The above-discussed and other features and advantages of the present invention will be appreciated and understood by those skilled in the art from the following detailed description and drawings.

BRIEF DESCRIPTION OF THE DRAWINGS

Other advantages and characteristics of the present invention will result from the detailed description of a typical application and of preferred embodiments, based on the attached FIGURES, wherein like elements are numbered alike in the several FIGURES.

DETAILED DESCRIPTION OF THE PREFERRED EMBODIMENTS

Figure 1:
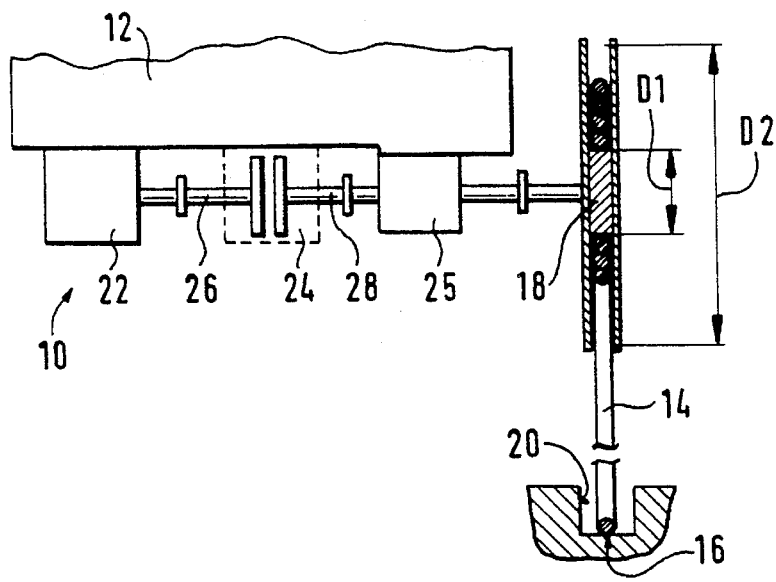
FIG. 1 is a diagrammatic view of a reeling-in/reeling-out device for an electrical power cable equipping a gantry crane.

In order to make things clearer and easier to understand, a description will first be given, by way of illustration, of an example of a typical application of a clutch according to the invention. FIG. 1 is a diagrammatic representation of a reeling-in/reeling-out device 10 equipping a gantry or tower crane 12. The function of this reeling-in/reeling-out device 10 is to reel-in, or alternately reel-out, an electrical power cable 14 during the movement of the gantry crane on a rolling track between two opposite end positions. One end of the cable 14 is attached to the ground at a fixed point 16, most often in a median position between the two end positions. The other end of the cable 14 is wound onto a reeling-in/reeling-out drum 18, attached to the movable gantry crane 12. The reference 20 represents a channel in the ground in which the cable 14 is laid as it is unwound from the reeling-in/reeling-out drum 18. The reeling-in/reeling-out device 10 comprises, outside the reeling-in/reeling-out drum 18, a drive motor 22, a magnetic hysteresis clutch 24 and, most often, a speed reducer 25. The motor 22, most often an asynchronous three-phase motor rotating, for example, at a speed of 1440 rpm, is coupled to an input shaft 26 of the magnetic hysteresis clutch 24. An output shaft 28 of the latter is coupled via the speed reducer 25 to the reeling-in/reeling-out drum 18.

As the gantry crane 12 moves from its median position in the direction of one of its two end positions, the cable 14 is unwound by the reeling-in/reeling-out drum 18 in order to be laid in the channel 20. The reeling-in/reeling-out device 10 must produce during this operation a braking torque that keeps the cable 14 under tension as it is unwound. It will be noted that the direction of rotation of the reeling-in/reeling-out drum 18 is opposite that of the motor 22 during the reeling-out operation.

As the gantry crane 12 returns towards its median position, the cable 14 is wound onto the reeling-in/reeling-out drum 18. The reeling-in/reeling-out device 10 must now produce a working torque sufficient to remove the cable 14 from its channel 16, to lift it up and to wind it onto the reeling-in/reeling-out drum 18. It will be noted that the direction of rotation of the reeling-in/reeling-out drum 18 is the same as that of the motor 22 during the reeling-in operation.

When the gantry crane 12 has stopped moving, the reeling-in/reeling-out device 10 must also supply a torque for braking the reeling-in/reeling-out drum 18 in order to keep the cable 14 under tension. It will be noted that the reeling-in/reeling-out drum 18 has stopped rotating whereas the motor 22 still rotates at its nominal speed of for example 1440 rpm.

Figure 2:
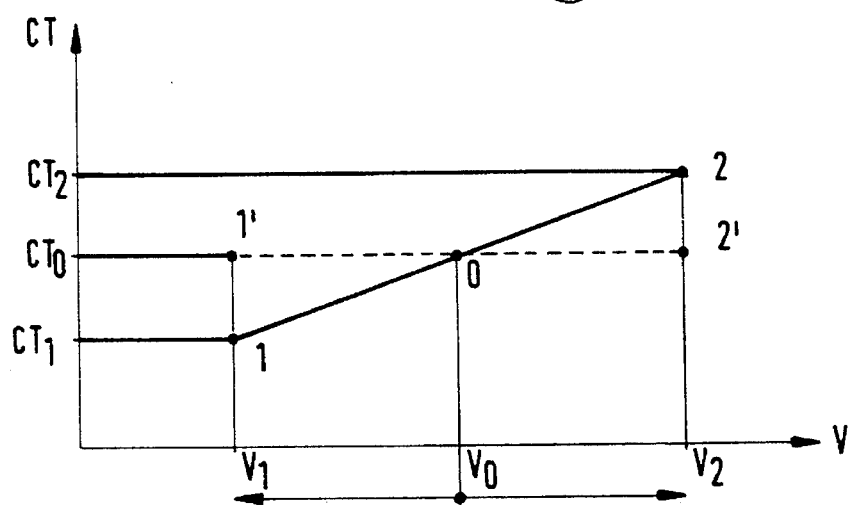
FIG. 2 is a diagram representing the dependence of the transmitted torque on the slip, for a magnetic hysteresis clutch according to the state of the art.

FIG. 2 represents graphically the behavior of a magnetic hysteresis clutch 24, according to the state of the art, in the reeling-in/reeling-out device 10 of FIG. 1. The abscissa represents the slip (e.g. the relative velocity) between the magnetic inductor and the magnetic armature of such a clutch 24 and the ordinate represents the torque at the output of the clutch 24. The slip $V_0$ corresponds to the case where the output shaft 28 has stopped moving, while the motor 22 still rotates at its nominal speed. This is the situation in which the gantry crane 12 has stopped moving. Rates of slip below $V_0$ correspond to situations in which the output shaft 28 rotates in the same direction as the motor 22. This is the case for the reeling-in of the cable 14. Rates of slip above $V_0$ correspond to situations in which the output shaft 28 rotates in the opposite direction to that of the motor 22. This is the case for the reeling-out of the cable 14.

The curve (1', 2') represents the theoretical characteristic curve of the magnetic hysteresis clutch. The torque transmitted between the magnetic inductor and the magnetic armature is independent of the slip between the two. However, in practice it is found that the torque transmitted between the magnetic inductor and the magnetic armature increases with the slip (cf. curve (1, 2)). This phenomenon is due to the fact that the magnetic inductor rotating relatively with respect to the magnetic armature naturally creates, in the ferromagnetic hysteresis material of the magnetic armature, eddy currents that increase the coupling between the magnetic armature and the magnetic inductor. In FIG. 2 it may be seen that the torque $CT_1$, transmitted during the reeling-in of the cable 14, is far less important than the torque $CT_2$ transmitted during the reeling-out of the cable 14.

Let T(MIN) be the minimum traction force to be applied, at the reeling-in/reeling-out drum 18, to the cable 14 in order to withdraw it from the channel 20, to bring it back up and to wind it onto the reeling-in/reeling-out drum 18. The minimum torque needed by the output shaft 28 of the clutch 24 necessary to produce T(MIN) thus equals:

$$CT_1 = (D_2/2) * T(MIN) * (r/n) \quad (1)$$

where:

D2 is the external diameter of the reeling-in/reeling-out drum 18;

n is the efficiency of the speed reducer 25;

r is the reduction ratio of the speed reducer 25.

The traction force applied to the cable 14 at the reeling-in/reeling-out drum 18 reaches a maximum when the operation of reeling-in the cable 14 approaches its end, that is to say when the speed between the magnetic inductor and the magnetic armature is at a maximum. Expressed as a function of the braking torque $CT_2$ at the output shaft 28 of the clutch 24, this traction force is given by:

$$T(MAX) = (2/D_1) * CT_2 * (1/n) \quad (2)$$

where:

$D_1$ is the internal diameter of the reeling-in/reeling-out drum 18;

From (1) and (2) we may thus obtain:

$$T(MAX) = (D_2/D_1) * (CT_2/CT_1) * (1/n^2) * T(MIN) \quad (3)$$

In this equation (3), we may assume, for example, that $(D_2 D_1) = 3$; $n = 0.9$; giving:

$$T(MAX) = 3.7 * (CT_2/CT_1) * T(MIN) \quad (4)$$

Without any precautions to prevent eddy currents in the ferromagnetic hysteresis material, the behavior is described by the curve (1, 2) of FIG. 2. $CT_2$ is approximately 100% greater than $CT_1$, that is to say that T(MAX) is approximately 7.4 times greater than T(MIN).

By taking suitable precautions to prevent eddy currents in the ferromagnetic hysteresis material, it is of course possible that the behavior of the prior art clutch approaches that described by the theoretical curve (1', 2') in the diagram of FIG. 2. But even in this case, where $CT_1$ is substantially equal to $CT_2$, T(MAX) still remains 3.7 times greater than T(MIN).

From the functional point of view of the reeling-in/reeling-out device 10, there is however no reason to have a traction force greater than T(MIN). But, while mechanically designing the cable, it is necessary, of course, to take into account T(MAX) and not T(MIN), which leads to an appreciable mechanical overdesigning of the cable 14.

Figure 4:
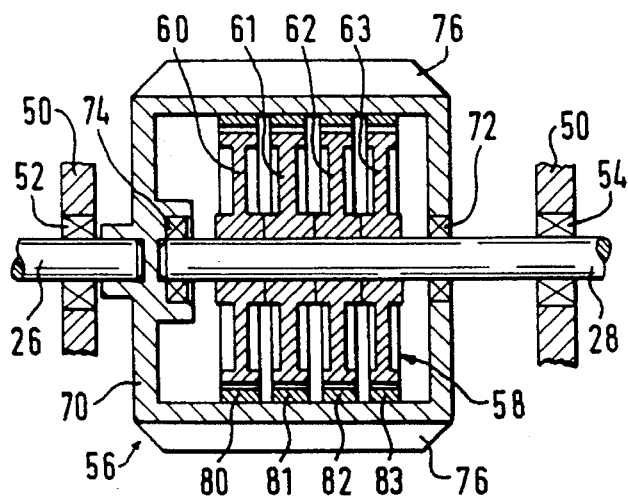
FIG. 4 is a longitudinal cross-section of a preferred embodiment of a magnetic hysteresis clutch according to the invention.

FIGS. 4 to 7 represent constructional details of a first embodiment of a magnetic hysteresis clutch according to the invention. FIG. 4 shows that the input shaft 26 and the output shaft 28 are supported in a coaxial manner in a frame 50, for example by means of rolling bearings 52 and 54. The input shaft 26 is rigidly attached to a magnetic armature 56, while the output shaft 28 is rigidly attached to a magnetic inductor 58.

The magnetic inductor 58 comprises a plurality of wheels 60, 61, 62, 63 all rigidly attached to the output shaft 28 so as to be able to transmit a torque to the latter. Each of these wheels 60, 61, 62, 63 is fitted with a peripheral ring 64 (cf. FIG. 6) which supports permanent magnets 66 creating a magnetic field. Instead of using a relatively small number of permanent magnets with large pole surface areas (for example AlNiCo magnets), it has been found advantageous to use a large number of small permanent magnets with high magnetic density having small pole surface areas (for example of the order of 50 to 100 mm$^2$). It will be noted that each wheel of the magnetic inductor 58 can, for example, include more than one hundred small permanent magnets 66. In FIG. 7, which shows a view of the peripheral ring 64 of a wheel 60 of the magnetic inductor, it may be seen that the permanent magnets 66 have the shape of cylindrical pills which are simply inserted into blind bores 68 made in the peripheral ring 64. The permanent magnets "pills" 66 are held in place in these blind bores 68 by magnetic attraction.

The juxtaposition of a large number of permanent magnets 66 of small pole surface area makes it possible—by varying for example the polarity of the pole surface areas oriented outwards and the strength of the individual magnets and their arrangement on the peripheral ring 64—to finely modulate the magnetic field created around a wheel 60 of the magnetic inductor 58. Thus, the person skilled in the art will appreciate having at his disposal an easy means of optimizing the magnetic field.

The magnetic armature 56 comprises an external rotor 70 which surrounds the magnetic inductor 58. This external rotor 70 is rigidly attached to one side of the input shaft 26 so as to be able to receive a torque from the latter. On the axially opposite side, the external rotor 70 bears, advantageously through a rolling bearing 72, on the output shaft 28. Moreover, the latter is advantageously supported with its free end in a rolling bearing 74 integrated, on the side facing the input shaft 26, into the external rotor 70. Fins 76 extend axially along the external peripheral surface of the external rotor 70, effectively cooling the latter (cf. FIG. 5).

The external rotor 70 serves to support the ferromagnetic hysteresis material. The latter surrounds the peripheral rings 64 of the wheels 60, 61, 62, 63 of the magnetic inductor 58 so as to define, with respect to the permanent magnets 66, a radial clearance or air gap 78 (cf. FIG. 6). By way of illustration it will be noted that this radial clearance 78 may, for example, measure a few tenths of a millimeter.

Figure 6:
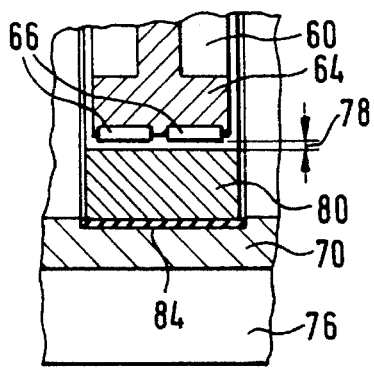
FIG. 6 is a detail of the longitudinal cross-section of the clutch of FIG. 4.
Figure 5:
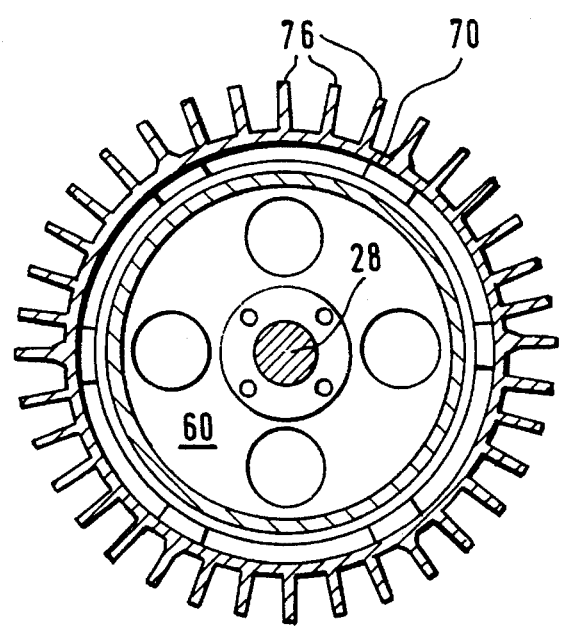
FIG. 5 is a transverse cross-section through the same clutch as that of FIG. 4.
Figure 7:
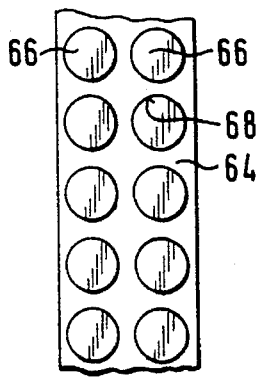
FIG. 7 is a detail view of a magnetic inductor wheel of the clutch of FIG. 4.

In FIGS. 4 and 6, a separate ring 80, 81, 82, 83 made of ferromagnetic hysteresis material is associated with each wheel 60, 61, 62, 63 of the magnetic inductor. Each of these rings 80, 81, 82, 83 may be constituted from a single piece or be divided into annular segments fixed individually, for example, by adhesive bonding in a groove 84 of the inner wall of the external rotor 70.

The ferromagnetic hysteresis material used is preferably a sintered material comprising metal oxide powders which are electrically insulated. The material thus obtained has a high isotropic electrical resistance which effectively prevents the generation of eddy currents in the magnetic armature. In addition, its magnetic properties are excellent and its working temperature is relatively high. However, in order to obtain a similar result, it would be also possible to use a finely laminated material in which sheets made of ferromagnetic hysteresis material are separated from each other by a dielectric film. The behavior of the ferromagnetic material, when it is subjected to temperature variations in a magnetic field, will be analyzed later.

An important feature of this magnetic clutch resides in its thermal design. The variable magnetic field, induced in the ferromagnetic hysteresis material, produces heating therein proportional to the frequency with which the magnetic field varies, and therefore proportional to the slip between the magnetic inductor 58 and the magnetic armature 56. The more the slip increases, the more the thermal energy released in the ferromagnetic hysteresis material increases.

Figure 9:
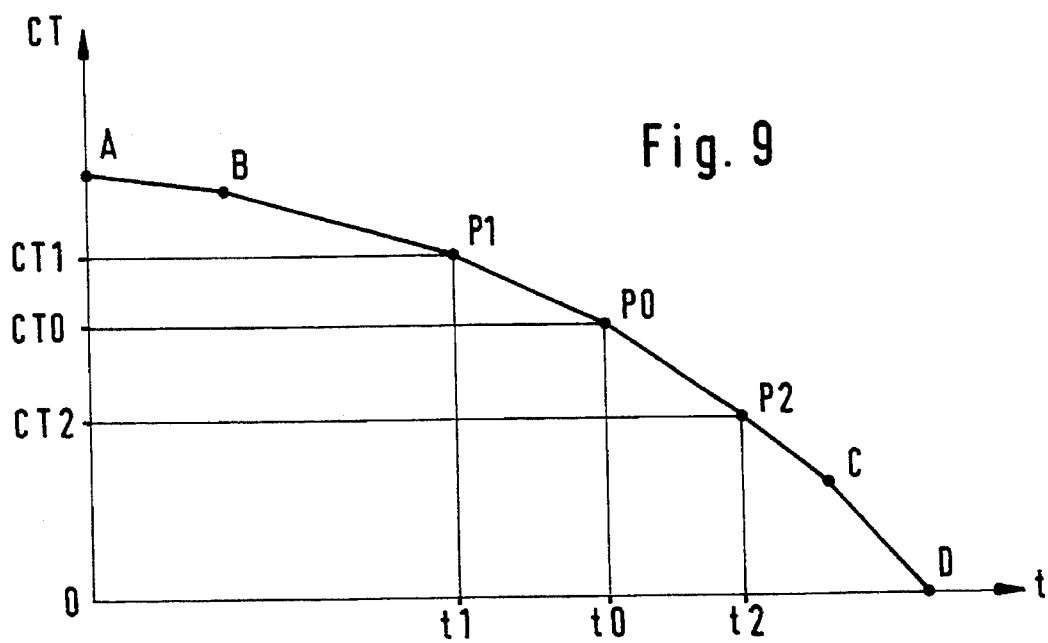
FIG. 9 is a diagram representing the relationship between the temperature and the magnetization of the ferromagnetic hysteresis material.

FIG. 9 represents the typical behavior of the transmitted torque CT as a relation of the temperature of the ferromagnetic hysteresis material in a magnetic field. It is found that, for the ferromagnetic material used, the transmitted torque CT firstly decreases slowly when the temperature t increases, as shown in segment [A–B] of the curve. It is in this segment [A–B] that the prior art magnetic hysteresis clutches are working. It will be noted that the temperature dependent decrease of the transmitted torque is far to small in this segment [A–B] to be noticed in practice (it will indeed be masked by other phenomena producing an increase of the transmitted torque, as e.g. eddy currents). In a segment [B–C] of the curve, there is however a pronounced dependence of the transmitted torque CT on the temperature t of the ferromagnetic hysteresis material. Beyond the point C, the curve falls very steeply towards the point D which represents the Curie point of the ferromagnetic hysteresis material, that is to say the temperature for which the magnetization of the material subjected to the magnetic field becomes zero and for which the ferromagnetic behavior of the material is replaced by a paramagnetic behavior. By way of example only, for a ferromagnetic material used in a prototype of the clutch, a 50% decrease of the transmitted couple was noted for a temperature increase of the ferromagnetic material of less than 200° C.

The thermal design of the magnetic hysteresis clutch is therefore achieved so that the minimum temperature $t_1$ and the maximum temperature $t_2$ of the ferromagnetic hysteresis material define, on the curve CT(t), a working segment [$P_1$, $P_2$] lying entirely within the interval [B–C] called the working range. It is recalled that the point $P_1$ corresponds to the situation in which the slip between the magnetic inductor 58 and the magnetic armature 56 is at a minimum, while the point $P_2$ corresponds to the situation in which the slip between the magnetic inductor 58 and the magnetic armature 56 is at a maximum.

In order to achieve this thermal design, it is possible, for example, to vary one or more of the following parameters: the physical characteristics of the ferromagnetic hysteresis material (thermal conductivity, Curie point, density, etc.); the thickness of the rings 80, 81, 82, 83; the heat transfer between the rings 80, 81, 82, 83 and the external rotor 70 (possibly use of a thermal insulation between the two); the design of the external rotor 70 (materials, dimensions of the fins 76, etc.); the drive speed of the external rotor 70; the radial dimension of the air gap 78; the strength of the field produced by the permanent magnets 66; the number of reversals of the polarity of the magnetic field surrounding each wheel 60, 61, 62, 63 of the magnetic inductor 58; etc.

As regards the choice of ferromagnetic hysteresis material, it should be observed that the working temperature limit of this material must be greater than the temperature $t_c$ which corresponds to the point C on the curve of FIG. 9.

Figure 3:
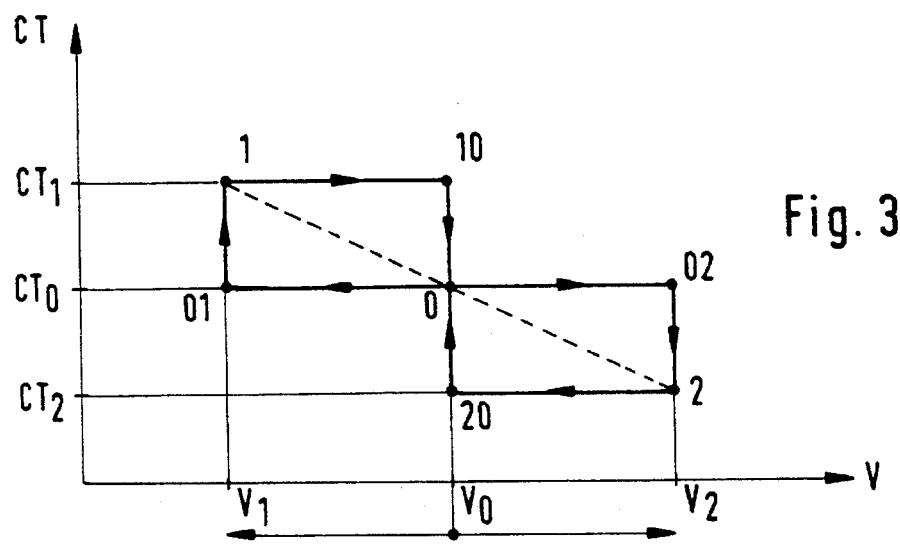
FIG. 3 is a diagram similar to FIG. 2 representing the typical dependence of the transmitted torque on the slip for a magnetic hysteresis clutch according to the invention.

FIG. 3 represents graphically, in a diagram similar to that of FIG. 2, the behavior of a magnetic clutch according to the invention in the reeling-in/reeling-out device of FIG. 9. When the gantry crane 12 has stopped moving, the slip between the magnetic inductor 58 and the armature 56 is equal to $V_0$ and the braking torque equals $CT_0$. This situation corresponds to the point 0 in the diagram and the operating temperature of the ferromagnetic hysteresis material is $t_0$. If the cable 14 is unwound, the slip increases from $V_0$ to $V_2$. The braking torque remains constant, at least initially, since there are no eddy currents generated in the ferromagnetic hysteresis material. The operating point moves from the point 0 towards the point 02. However, the increase in the slip from $V_0$ to $V_2$ causes the ferromagnetic hysteresis material to heat up from the temperature $t_0$ to the temperature $t_2$; that is to say, in the diagram of FIG. 9, a passage from the point $P_0$ to the point $P_2$. This results in a decrease in the magnetization of the ferromagnetic hysteresis, which manifests itself in a decrease in the braking torque from $CT_0$ to $CT_2$. In FIG. 3 the working point passes from the point 02 towards the point 2. If the elements made of ferromagnetic hysteresis materials have a relatively small mass, as is the case in the clutch of FIGS. 4 to 7, the passage of their operating temperature $t_0$ to the temperature $t_2$ takes place rapidly and requires barely more than a few tens of seconds (typically 20 seconds in a prototype clutch).

If the gantry crane 14 is stopped, the slip decreases from $V_2$ to $V_0$, that is to say in FIG. 3 the operating point passes from the point 2 to the point 20. At the same time, the losses, due to hysteresis, in the magnetic armature decrease and the operating temperature of the ferromagnetic hysteresis material falls from $t_2$ towards $t_0$. This results in an increase in the magnetization of the ferromagnetic hysteresis material and, consequently, in an increase in the braking torque from $CT_2$ to $CT_0$ in FIG. 9, thus returning to the starting point 0 in the diagram of FIG. 3.

If the cable 14 is being wound, the slip decreases from $V_0$ to $V_1$. The reeling-in torque developed at the output of the magnetic clutch remains constant, at least during the first few seconds, since there are no eddy currents generated in the ferromagnetic hysteresis material. The operating point moves from the point 0 towards the point 01 in FIG. 3. However, the decrease in the slip from $V_0$ to $V_1$ causes a decrease in the energy released by the hysteresis effect in the ferromagnetic hysteresis material. This results in a rapid decrease in the operating temperature of the latter from $t_0$ to $t_1$, hence a rapid increase in the magnetization and, consequently, an increase in the torque developed at the output of the magnetic clutch 24 from $CT_0$ to $CT_1$ in FIG. 9. In the diagram of FIG. 3, this corresponds to passing from the point 01 to the point 1.

If the gantry crane 14 is stopped, the slip increases once again from $V_1$ to $V_0$, that is to say the operating point passes from the point 1 to the point 10. At the same time, the losses, due to hysteresis, in the magnetic armature increase and the operating temperature of the ferromagnetic hysteresis material rises again from $t_1$ to $t_0$. This results in a decrease in the magnetization of the ferromagnetic hysteresis material and, consequently in a decrease in the torque developed at the output of the clutch 24. This thus corresponds to returning to the starting point 0 in the diagram of FIG. 3.

In summary, the clutch is characterized by an output torque which decreases in strength when the slip between the magnetic inductor and the magnetic armature increases. In other words, the winding or reeling-in torque is always greater than the braking or reeling-out torque.

In Equation (4), mentioned earlier, the ratio $CT_{2/CT1}$ is now smaller than unity, this naturally reducing the difference between T(MAX) and T(MIN). As a result, the mechanical strength of power cable 14 in the reeling-in/reeling-out device 10 of FIG. 1 can be lower with a magnetic hysteresis clutch according to the present invention, than with a prior art clutch.

Given that, in a clutch according to the present invention, the transmitted torque CT decreases when the slip increases, it is possible to tolerate higher rates of slip between the magnetic inductor and the magnetic armature. This may result in the speed reducer 25 having a smaller reduction ratio and/or the motor 22 having a higher speed of rotation.

Figure 10:
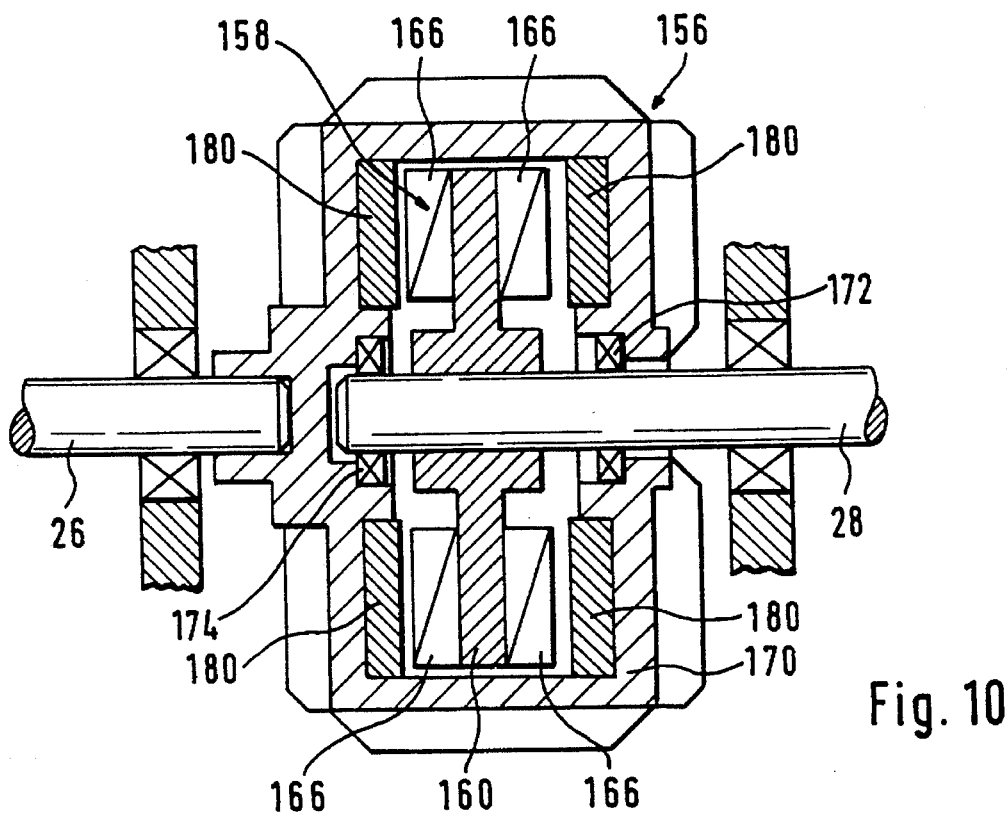
FIG. 10 is a longitudinal cross-section through a second embodiment of the magnetic hysteresis clutch according to the invention.

FIG. 10 represents an alternative embodiment of a magnetic clutch according to the invention. The mounting of the input shaft 26 and of the output shaft 28 are, in principle, identical to FIG. 4 and will not be described in any more detail. The magnetic inductor 158 comprises a disc 160 rigidly attached to the output shaft 28 so as to be able to transmit a torque to the latter. This disc is fitted, on its two opposite faces, with permanent magnets 166. These are, for example, conventional AlNiCo magnets, and therefore quite bulky. However, it would also be possible to use small permanent magnets with a higher magnetic density, such as those described in relation with the embodiment of FIG. 4.

The magnetic armature 156 comprises an external rotor 170 which surrounds the magnetic inductor 158. This external rotor 170 is rigidly attached to the input shaft 26 so as to be able to receive a torque from the latter. Plates 180, constituted from a ferromagnetic hysteresis material which is selected as described hereinabove, are supported on each of the two front ends of the external rotor 170 so as to be axially juxtaposed to the two surfaces of the disc 160 which support the permanent magnets 166. Between the magnets 166 and the plates 180 facing them, an axial clearance exists which guarantees that the magnets 166 rotate freely with respect to the plates 180. As in the case of FIG. 4, the thermal design of the proposed magnetic clutch is then achieved so that the operating temperature t 1 of the plates 180, which corresponds to a minimum slip $V_1$, and the operating temperature $t_2$, which corresponds to a maximum slip $V_2$, define a working segment $[P_1-P_2]$ on the characteristic curve CT(t), within the working range [B–C] of the ferromagnetic material (cf. FIG. 9). In this manner, the magnetic clutch of FIG. 10 is also characterized by an output torque which decreases when the slip between the magnetic inductor and the magnetic armature increases.

It should however be noted that the embodiment of FIG. 4 has, compared to the embodiment of FIG. 10, many advantages.

A first advantage is that the transmission of a torque from the magnetic inductor to the magnetic armature via the radial air gap in FIG. 4 involves a much greater lever arm than the transmission of a torque via the axial air gap in the device of FIG. 10. This means that, for the transmission of the same torque, the clutch of FIG. 4 requires a total magnetic induction lower than that required in the case of FIG. 9.

A second advantage is that a radial air gap clutch, according to FIG. 4, may be designed so as to compensate for gradual reduction in the transmitted torque during operation of the clutch. This reduction in the transmitted torque can be explained by the permanent magnets of the magnetic inductor heating during a prolonged operation; this heating leading to a decrease in the strength of their magnetic field. The heating of the magnets is mainly explained by a heat transfer by radiation and convection via the air gap between the ferromagnetic hysteresis material raised to a relatively high mean working temperature and the permanent magnets facing it. Now, in a clutch according to FIG. 4, this gradual reduction in the transmitted torque due to the heating of the permanent magnets 66, may be compensated by profiting from the thermal expansion of the wheels 60, 61, 62, 63 which accompanies the heating of the permanent magnets 66. Indeed it is sufficient for the wheels 60, 61, 62, 63 of the magnetic inductor 58 to be designed so that their radial expansion causes a decrease in the radial air gap 78 which is sufficient to compensate for the decrease in the strength of the magnetic field due to the heating of the permanent magnets 66. It will be noted that the radial expansion necessary for this purpose is very low, since the transmitted torque is inversely proportional to the cube of the radial extension of the air gap between the magnets 66 and the rings 80, 81, 82, 83. As the magnetic inductor wheels 60, 61, 62, 63 have a relatively high thermal inertia, the latter are not or only very slightly affected by the temperature changes of the ferromagnetic material due to the changes of the slip. The wheels 60, 61, 62, 63 preferably consist of a material with a high thermal conductivity. Heat transfer between the magnets 66 and the peripheral ring 64 of the magnetic inductor wheels 60, 61, 62, 63 should be as good as possible. A heat conducting paste may be used to increase in blind bores 68 the thermal coupling between the magnets 66 and the magnetic inductor wheels 60, 61, 62, 63.

A third notable advantage is that the magnetic inductor composed of a plurality of wheels 60, 61, 62, 63 arranged on the output shaft 28 offers appreciable facilities as regards the designing of the clutch. Indeed, in order to increase the transmitted torque, it is sufficient to add an additional wheel to the magnetic inductor 58 and an additional ring to the magnetic armature 56. In order to reduce the transmitted torque, it is sufficient, of course, to remove a wheel from the magnetic inductor 58. Given that the heating of the ferromagnetic hysteresis material is a function of the strength of the magnetic field, it is also possible to influence the thermal behavior (and thereby the characteristic curve CT(t)) of the ferromagnetic hysteresis material by choosing a suitable number of inductor wheels.

A fourth advantage of a clutch according to FIG. 4 resides in the large number of small magnets 66 per inductor wheel 60, 61, 62, 63. By varying the power, the polarity and the distribution of these numerous small magnets, it is possible to finely modulate the magnetic field surrounding each wheel 60, 61, 62, 63. In this manner, the working point $P_0$ on the curve CT(t) of FIG. 9 may be precisely positioned.

A fifth advantage of a clutch according to FIG. 4 resides in the design of the magnetic armature in the form of tings 80, 81, 82, 83 surrounding the wheels 60, 61, 62, 63 of the magnetic inductor 58. This is because these rings 80, 81, 82, 83 are characterized by a low mass and have therefore a low thermal inertia, which guarantees a rapid variation in their operating temperature when the energy dissipated by the hysteresis effect in the ferromagnetic material varies. Their cooling is ideal, since their contact surface area with the external rotor 70 is higher than their surface area oriented towards the magnets 66. The thermal energy produced in the rings 80, 81, 82, 83 is drained along the shortest possible path towards the longitudinal cooling fins 76. The bearings 74 and 72 a far away from the spots where the heat is generated on the rotor 70. In the clutch according to FIG. 10, the bearings 174, 172 are however located in the direct neighborhood of the ferromagnetic plates 180 and are therefore exposed to much higher working temperatures.

Figure 8:
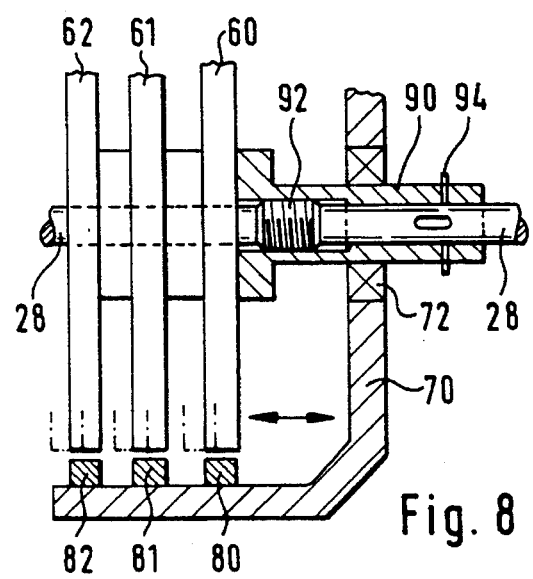
FIG. 8 is a longitudinal cross-section through a special embodiment of the magnetic hysteresis clutch of FIG. 4.

A sixth advantage of a clutch according to FIG. 4 resides in the possibility to easily change the radial overlapping of the ferromagnetic rings 80, 81, 82, 83 and the magnetic inductor wheels 60, 61, 62, 63 and to finely adjust thereby the transmitted torque. FIG. 8 shows a preferred embodiment of a clutch wherein the radial overlapping of the ferromagnetic rings 80, 81, 82, 83. and the magnetic inductor wheels 60, 61, 62, 63 may be continuously adjusted between 0% and 100%, without having to dismantle the clutch. The wheels 60, 61, 62, 63 are assembled to form a rigid inductor bloc. Shaft 28 is slidingly guided in this inductor bloc without being attached to the latter. The inductor bloc is rigidly connected to a sleeve 90 axially guided through the bearing 72. This sleeve 90 is screwed on a threaded portion of shaft 28. It follows that a relative rotation of sleeve 90 and shaft 28 results in an axial displacement of the inductor bloc along shaft 28. A pin 94 is used to bloc the sleeve 90 in rotation on shaft 28.

Finally, all that remains to be noted, in this context, is that the radial air gap can, of course, be produced more easily and more accurately than an axial air gap between two rotating discs. In a clutch with a radial air gap between the magnetic inductor and the magnetic armature, it is consequently possible to work with a smaller air gap than in a clutch with an axial clearance between the magnetic inductor 58 and the magnetic armature 56. This results in a markedly lower magnetic field being needed to transmit the same torque.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A magnetic hysteresis clutch comprising:

a rotor supporting a ferromagnetic hysteresis material said rotor having a radius and being rotatable about an axis, and a rotary magnetic inductor capable of inducing a magnetic field in the ferromagnetic hysteresis material of the rotor said magnetic inductor having a radius and being rotatable about said axis;

said magnetic inductor and said ferromagnetic hysteresis material being arranged with a radial or axial air gap there between, so as to allow relative rotation of one with respect to the other with a variable slip wherein;

an increase in the losses in the ferromagnetic material, which accompanies a given increase in the slip, leads to a reversible decrease in the magnetization of the ferromagnetic hysteresis material in the magnetic field of the rotary magnetic inductor sufficient to produce a reversible decrease in the transmitted torque.

2. A magnetic hysteresis clutch as claimed in claim 1 wherein the ferromagnetic material is a material having a high electrical resistivity.

3. A magnetic hysteresis clutch as claimed in claim 2 wherein the ferromagnetic material is a sintered material which is based on electrically insulated metal powders.

4. A magnetic hysteresis clutch as claimed in claim 1 wherein the air gap between the magnetic inductor and the ferromagnetic hysteresis material is a radial air gap.

5. A magnetic hysteresis clutch as claimed in claim 4 wherein the magnetic inductor comprises a plurality of wheels mounted on a shaft, each of said wheels supporting a plurality of permanent magnets on a radial peripheral ring.

6. A magnetic hysteresis clutch as claimed in claim 5 wherein the ferromagnetic hysteresis material is constituted in the form of axially separated rings, each of which rings surrounding one of said wheels and defining a radial air gap with the latter.

7. A magnetic hysteresis clutch as claimed in claim 6 wherein the radial overlapping of at least one of said wheels and the corresponding ring is adjustable.

8. A magnetic hysteresis clutch as claimed in claim 6 wherein the rotor supporting the rings comprises longitudinal cooling fins.

9. A magnetic hysteresis clutch as claimed in claim 5 wherein each of the said wheels of the inductor supports a plurality of individual magnets.

10. A magnetic hysteresis clutch as claimed in claim 6 wherein heating and cooling, of the permanent magnets in continuous operation is accompanied by parallel heating and parallel cooling, of the wheels supporting these permanent magnets, so that the variations in the diameters of the wheels, due to this heating and cooling, automatically compensate for a decrease and an increase, respectively, in the magnetic field produced, by a reduction, or an increase, in the air gap.

11. A reeling-in/reeling-out device comprising a drive motor and a reeling-in/reeling-out drum, in combination with a magnetic hysteresis clutch according to claim 1 wherein said magnetic inductor is coupled to the reeling-in/reeling-out drum and said rotor supporting the ferromagnetic hysteresis material is coupled to the drive motor.

12. A reeling-in/reeling-out device as claimed in claim 11, including a speed reducer connected between the rotor and the reeling-in/reeling-out drum.

13. A magnetic hysteresis clutch as claimed in claim 7 wherein the rotor supporting the rings comprises longitudinal cooling fins.

* * * * *